United States Patent [19]

Klimaitis

[11] 4,105,098

[45] Aug. 8, 1978

[54] LARGE LOCKING SNUBBER

[75] Inventor: Martin K. Klimaitis, Alta Loma, Calif.

[73] Assignee: Pacific Scientific Company, City of Commerce, Calif.

[21] Appl. No.: 838,286

[22] Filed: Sep. 30, 1977

[51] Int. Cl.² .............................................. F16F 7/04
[52] U.S. Cl. .............................. 188/1 B; 74/424.8 R; 188/134
[58] Field of Search ........ 74/89.15, 424.8 R, 424.8 B; 188/1 R, 1 B, 129, 134, 135; 248/54 CS

[56] References Cited

U.S. PATENT DOCUMENTS

| 3,756,351 | 9/1973 | Sasaki | 188/1 B |
| 3,876,040 | 4/1975 | Yang | 188/1 B |
| 3,983,965 | 10/1976 | Wright | 188/1 B |

*Primary Examiner*—Duane A. Reger
*Attorney, Agent, or Firm*—Knobbe, Martens, Olson, Hubbard & Bear

[57] ABSTRACT

A telescoping, shock absorbing strut capable of supporting extremely large loads in which an overhauling lead screw drives a tubular inertia member for sensing a motion threshold. Nonoverhauling threaded members are synchronized and do not contact when rotated at the proper speed by the overhauling lead screw. When the telescoping forces induce motion in the strut which is above the motion threshold, however, the nonoverhauling screw threads engage to support substantial loads in a locked strut configuration. By driving the tubular inertia member with a thin walled tubular driving element, the tubular inertia member in extremely large struts of this type may be maintained relatively small in size, so that the motion threshold sensing mechanism can also be maintained relatively small in size. The desynchronization of the threads may be caused by either a unique axial spring and ball detent combination, or a unique torque rod interconnected between the thin walled tubular driving member and the overhauling lead screw.

26 Claims, 9 Drawing Figures

LARGE LOCKING SNUBBER

BACKGROUND OF THE INVENTION

The present invention relates to motion controlling struts or vibration arrestors and, more particularly, to a strut which may be connected between relatively moveable elements, such as steampipes in a power producing station and adjacent supporting structure, to limit motion between the steampipe and the structure or any pair of relatively moveable mechanical elements.

The present invention is an improvement over that which is disclosed in a patent application of William S. Wright and Elmer C. Yang, Ser. No. 695,223, filed June 11, 1976 and many of the elements of the present strut are similar to elements disclosed in that application. For this reason, the Wright, Yang disclosure is incorporated herein by reference.

The primary difficulty in applying the Wright and Yang apparatus to extremely large shock arrestors, such as those capable of handling several hundred thousand pounds when locked, is the necessity to increase the load bearing surfaces of the rotating tubular inertia member as well as the thickness of this member itself in order to support extremely large loads. Once this inertia member has been substantially increased in size, its inertia is, of course, also substantially increased, and thus the springs required to accelerate this member rotationally in response to axial accelerations must become much larger also. This increased size increases the overall cost and size of the motion arresting strut.

SUMMARY OF THE INVENTION

The present invention alleviates these difficulties associated with the prior art, and particularly the Wright-Yang apparatus, by substantially reducing the length of the tubular inertia member in such a system, the tubular member being driven by a thin walled tubular driving element which permits contact between the increased load bearing forces of the shortened inertia member. The shortening of the inertia member thus reduces the overall inertia of this member without affecting its load bearing capabilities, so that the size of the acceleration inducing spring as well as the bearings and other members associated therewith may be kept at a practical minimum. A unique axial spring-rotational detent combination is disclosed as a mechanism for sensing motion thresholds. In addition, a torsion spring is used in one of the embodiments as the acceleration sensing and thread desynchronizing member, this torsion member being mounted within the overhauling lead screw to reduce the required size of the device while still lending increased stiffness to absorb the forces generated by large rotating inertia masses.

These and other advantages of the present invention are best understood through a reference to the drawings, in which:

FIG. 1 is a sectional view taken through the axis of the strut of the present invention;

FIGS. 2 and 3 are cross-sectional views taken along lines 2—2 and 3—3, respectively, of FIG. 1;

DETAILED DESCRIPTION OF THE PREFERRED EMBODIMENT

Figures 1, 2, 3:
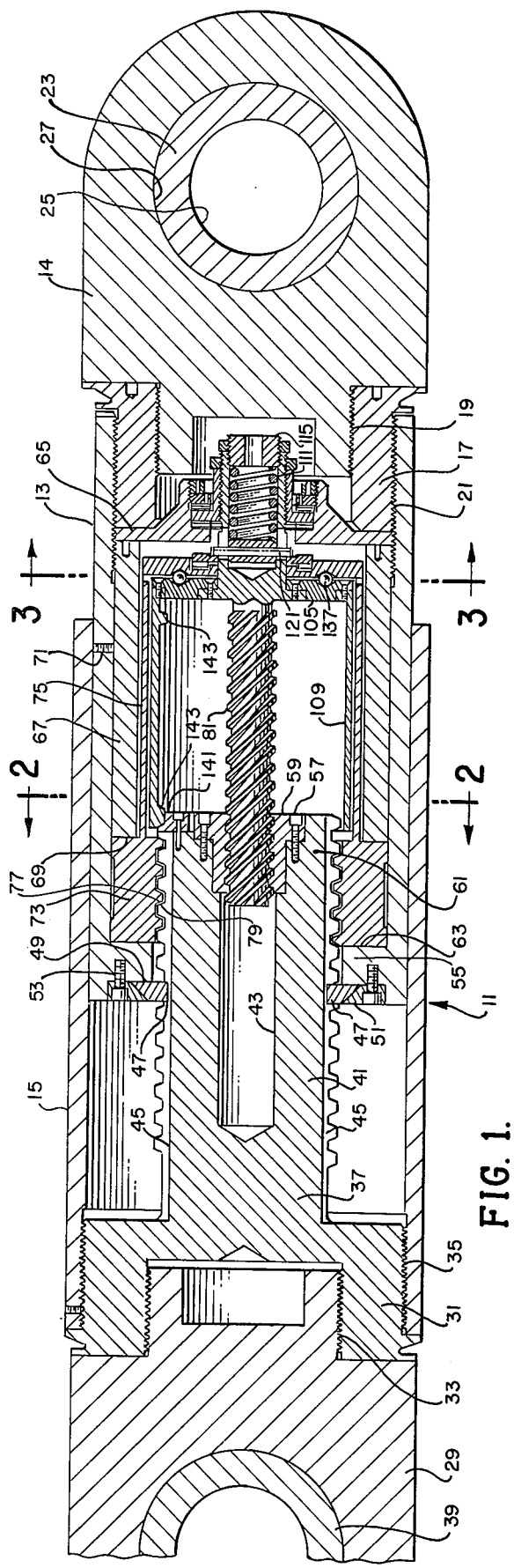
Figure 4:
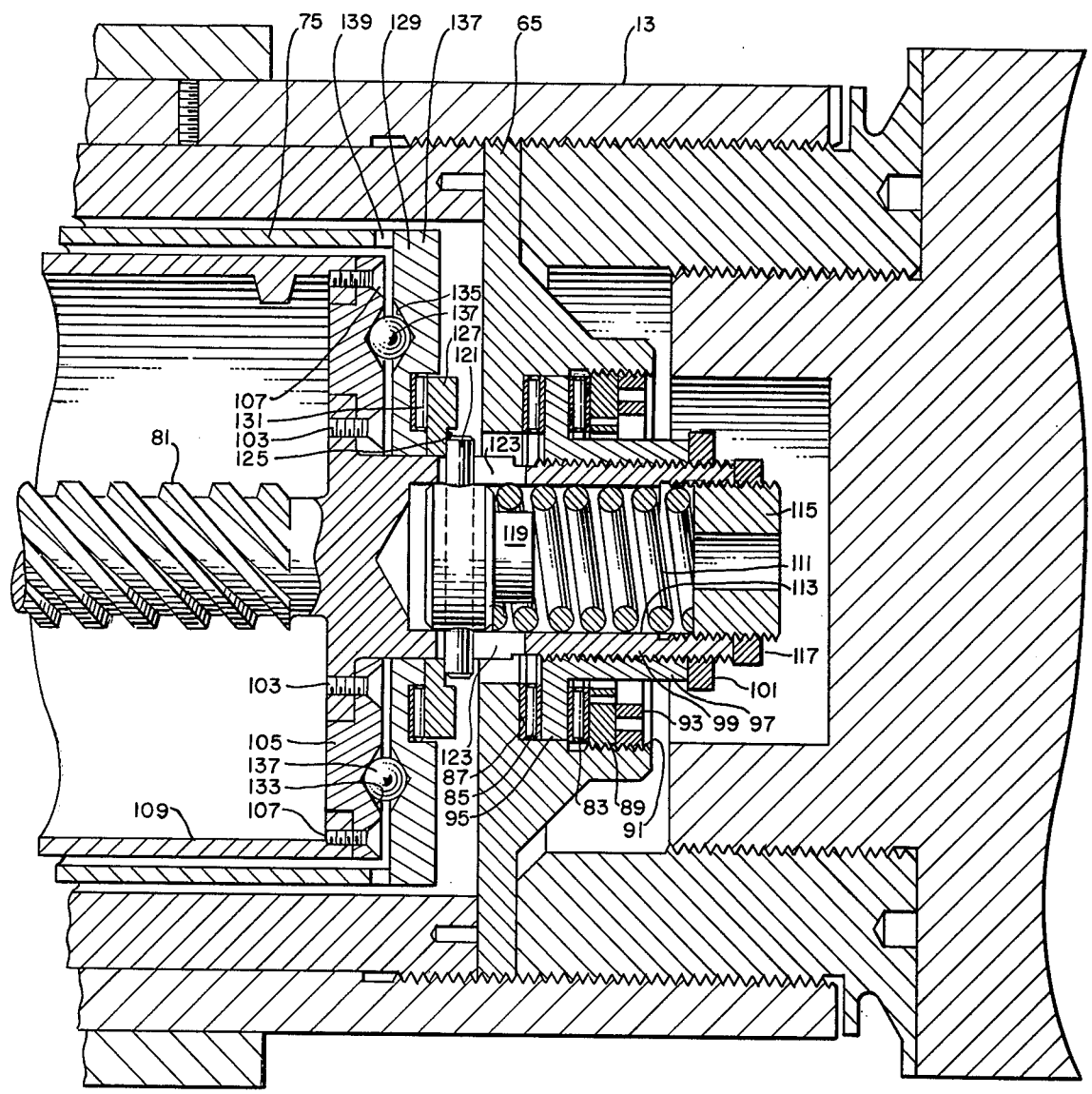
FIG. 4 is an enlarged sectional view similar to the section of FIG. 1 but broken away and showing the motion sensing mechanism alone for greater detail.
Figure 5:
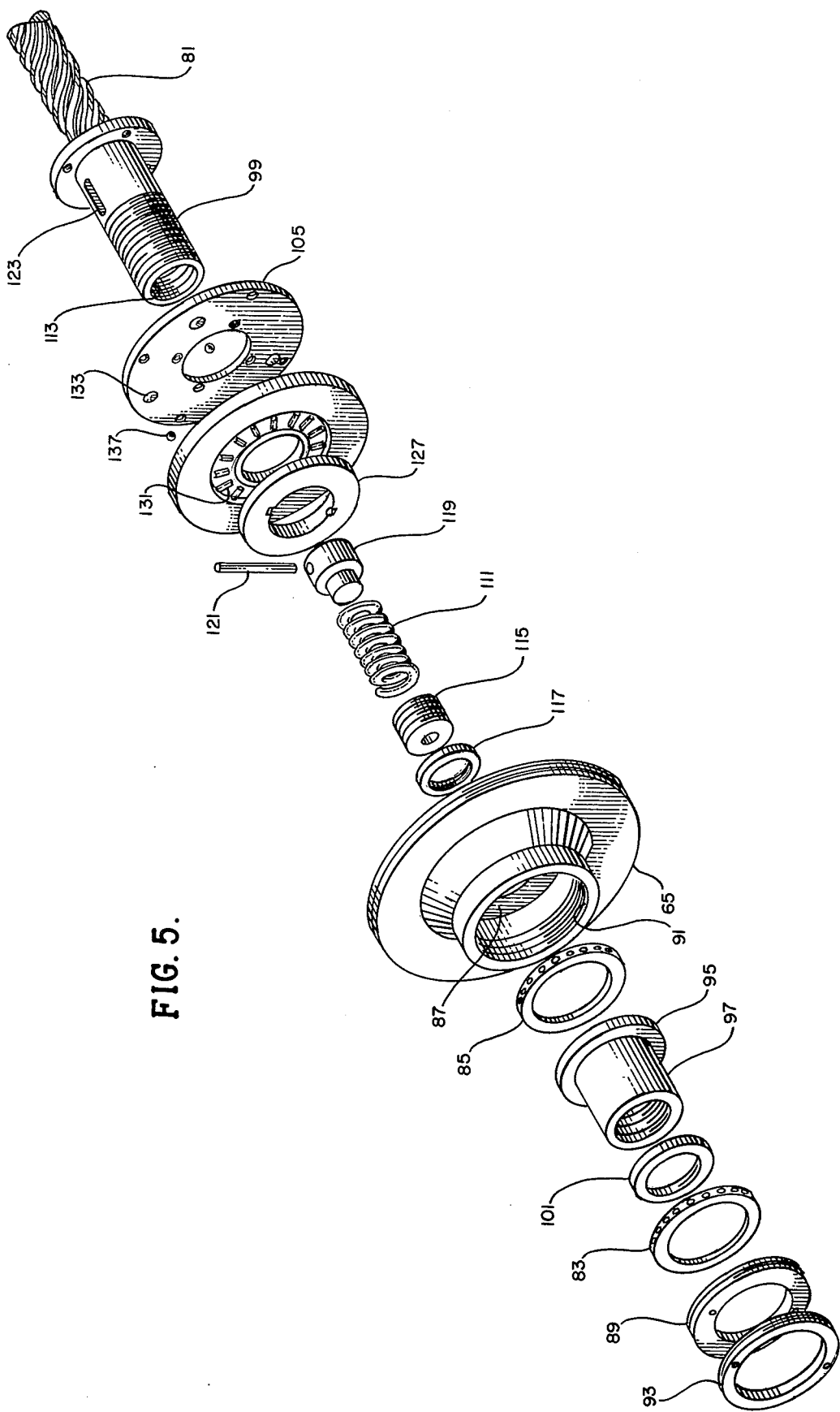
FIG. 5 is an exploded perspective view of the acceleration sensing and inertia drive mechanism of the present invention.
Figure 6:
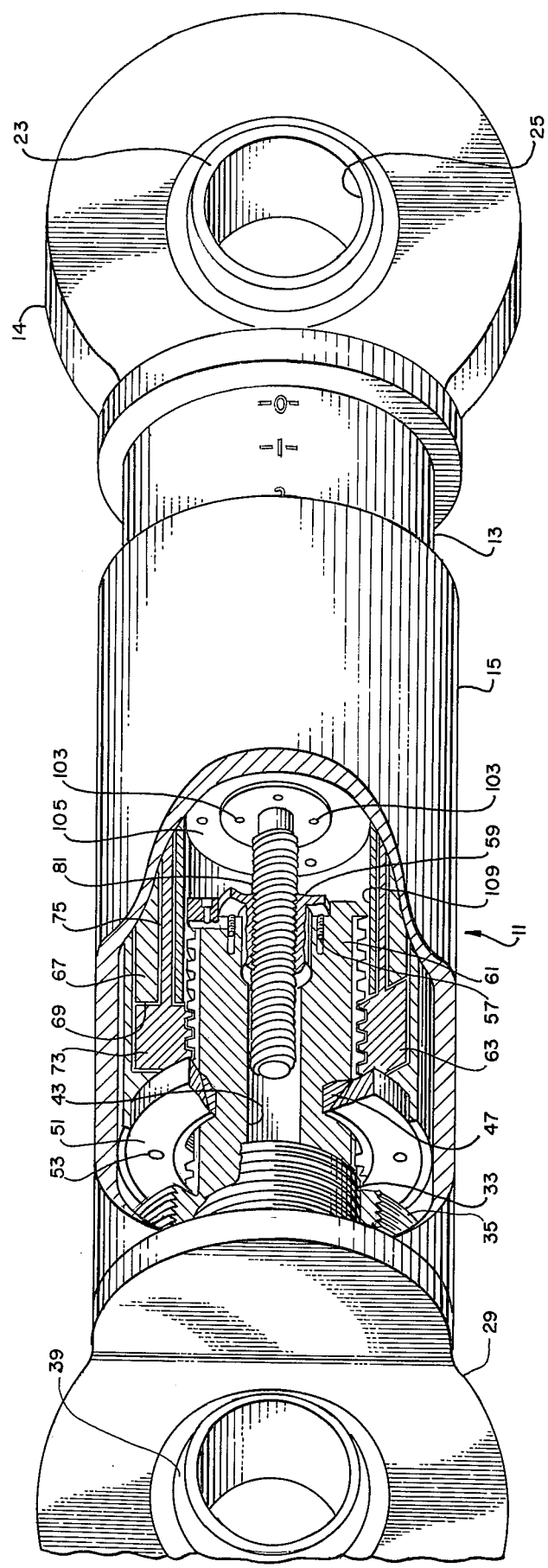
FIG. 6 is a perspective view of the strut of the present invention partially broken away to show the arrangement of the various parts.

Referring initially to FIGS. 1-6, the adjustable locking strut or motion arrestor 11 of the present invention is shown to include a first telescoping member 13 and a second telescoping member 15. The engaging surfaces of these members are machined to a close tolerance to slidingly receive one another and to thereby maintain the axial alignment of the entire locking strut 11.

The first telescoping member 13 is rigidly interconnected with an end cap 14 by means of an intermediate, thick walled, tubular sleeve 17 threaded at 19 and 21, respectively, to the end cap 14 and first telescoping member 13. It will be appreciated that the primary forces controlled by the locking strut 11 must be borne by the threaded interconnections 19,21 and these interconnections should be designed to substantially exceed the maximum force which will be applied to the strut 11.

The end cap 14 includes a spherical bearing 23 including a cylindrical bore 25. The spherical bearing 23 is fitted into a cylindrical bore 27 in the end cap 14 and permanently affixed within the bore 27. The spherical bearing 23 is free to rotate to a limited degree to facilitate mounting of the end cap 14 on a first relative moveable member, such as a yoke or other support member which includes a rod conforming to the bore 25.

The second telescoping member 15 is similarly connected to a second end cap 29 by an intermediate, thick walled, tubular member 31. This interconnection is made by threads 33 and 35 on the end cap 29 and second telescoping member 15, respectively. It will be noted that the thick walled tubular member 31 is formed as an extension of a central threaded shaft 37 as a convenience, although it will be recognized that the members 31 and 37 could be manufactured as separate parts. The second end cap 29 may be identical to the end cap 14, including a spherical bearing 39 for mounting the second telescoping member 15 to a second relatively moveable member. It should be understood that the motion between the end caps 14 and 29 follows the motion of two relatively moveable objects to which these end caps 14,29 are attached, and it is this motion which the locking strut 11 of the present application is designed to control.

More specifically, the locking strut 11 is designed to permit relatively slow movement between the end caps 14,29, and the relatively moveable objects to which they are attached, but is designed to become a rigid strut in the event of violent movement or vibration between the end caps 14,29. Such vibrations would occur, for example, if the strut 11 were used to support pipes in a thermal power station and an earthquake occurred. The strut, however, would permit relatively slow thermal movement of the pipe relative the supporting structure during normal power plant operation. The strut 11 thus provides an effective rigid support for such thermal piping or other mechanisms which are subject to damage in the event of violent movement but which must be free to move relatively slowly during normal operation for one reason or another. The present strut 11 senses the acceleration between the end caps 14,29, and the relatively moveable objects to which they are attached, and uses this acceleration to differentiate between relatively slow, desirable movement and relatively abrupt, undesirable movement.

As will be appreciated from the remaining disclosure in this application, the strut 11, in response to these acceleration levels, provides relatively free movement of the end caps 14,29 at low acceleration rates. Once an acceleration threshold has been reached by the application of excessive forces to the end caps 14,29 or the relatively moveable objects to which they are attached, the locking strut 11 becomes a rigid support, prohibiting relative axial movement between the end caps 14,29.

It should be understood that, in addition to connection with thermal piping in power plants, the strut 11 may be used in a wide variety of applications. In particular, it is useful in any apparatus where relative motion between two objects is to be permitted below a predetermined acceleration or velocity threshold (motion threshold) but is to be prohibited above this motion threshold. Thus, the present invention is adaptable as a recoil arrestor in artillary pieces. Such motion arrestors permit movement or adjustment of the artillary piece at relatively slow speeds but prohibit motion between the artillary piece and its mounting base when the piece is fired by sensing velocity or acceleration above a predetermined threshold.

More particularly, the present strut 11 is designed for installation where extremely large forces, typically in excess of 100,000 pounds, and often as high as one half million pounds, must be supported when the strut 11 becomes a rigid structure. These extremely high force levels require very large bearing surfaces within the strut 11, as will be explained in greater detail below. The constraints on the design of the strut 11 which are caused by these extremely large forces would also, under ordinary circumstances, require that the strut 11, as well as the motion sensing mechanism of the strut, be made exceptionally large, that is, simply a scaled up version of prior art struts, such as that shown in the patent application Ser. No. 695,223 mentioned above. As will be seen from the continuing description below, however, certain substantial modifications have been made to the structure shown in that application so that the strut 11 is able to support these extreme forces without being made excessively large or expensive.

The tubular sleeve 31 which, as described above, is rigidly connected to the end cap 29, is formed as a part of the central threaded shaft 37 which forms a first nonoverhauling threaded member 41, this member being mounted coaxially within the telescoping member 15 and attached by the threads 33 and 35 in a rigid manner both to the telescoping member 15 and the end cap 29. The threaded interconnection at 33,35 permits precise alignment of the axes of the telescoping member 15 and the first nonoverhauling threaded member 41 as is necessary for proper operation of the arrestor 11. Throughout a substantial portion of the length of the nonoverhauling threaded member 41 this member is formed as a tube having a central aperture 43 for receipt of an overhauling threaded member, as will be described in detail below. As used in the present disclosure, nonoverhauling threads are threads which will not induce rotary motion in response to axial forces, while overhauling threads are threads which will induce such rotary motion in response to axial forces.

The first nonoverhauling threaded member 41 includes plural, axially extending keyways 45 which receive plural keys 47 projecting unitarily radially inward from an annular ring 49 which has a triangular cross-section. This triangular cross-section is designed to conform with the trapezoidal cross-section of a second annular member 51, surrounding the annular member 49 and used to clamp the annular member 49 and its keys 47 in a desired rotational orientation. Plural screws 53 are used to clamp the annular ring 51 against the annular ring 49, forcing the annular ring 49 into frictional engagement with an enlarged end 55 of the first telescoping member 13. The interengagement of keys 47 and keyways 45 prohibits relative rotation between the first nonoverhauling threaded member 41 (and attached second telescoping member 15) and the triangular cross-section, annular member 49. By tightly clamping this annular member 49 against the end of the first telescoping member, a predetermined degree of friction may be introduced to prohibit relative rotation between the first telescoping member 13 and the first nonoverhauling threaded member 41. Since, as previously explained, both the first nonoverhauling threaded member 41 and the second telescoping member 15 are rigidly interengaged with the end cap 29, the screws 53 bearing on the annular ring 51 determine the degree of friction required for relative rotation of the pair of telescoping members 13 and 15. It is desired that the overall locking strut 11 be relatively resistive to rotation between the members 13 and 15, but that, during installation in the field, if necessary, the two end caps 14,29 should be rotatable through the application of sufficient force. This permitted rotation is provided through the rotation of the annular member 49 between the end 55 of the telescoping member 13 and the trapezoidal annular member 51, and the stiffness of the device counteracting such rotation may be adjusted by the screws 53.

As will become clearer through the remaining description, the key to operation of the locking strut 11 is the maintenance of synchronization of nonoverhauling threaded members prior to application of excessive acceleration. It will become clear also that a rotation of the telescoping members 13 and 15 to adjust these members for installation will not interfere with the synchronization of these threads.

Attached by a plurality of screws 57 to the end of the first nonoverhauling threaded member 41 is an overhauling nut 59. This nut is conveniently T-shaped in cross-section to conform with a double shouldered end 61 provided at the unsupported extremity of the nonoverhauling threaded member 41.

The enlarged end 55 of the first telescoping member 13 provides an internal shoulder 63 of very substantial width, this shoulder being required to support the substantial forces borne by the strut 11 when it is locked. The remaining length of the telescoping member 13 has a uniform cylindrical diameter. An annular nut 65 is threaded onto the threads 21 at the outer extremity of the first telescoping member 13 and this nut 65 in turn bears against a tubular sleeve 67 conforming to the inside diameter of the telescoping member 13 and also threaded at 21 for rigid engagement with the first telescoping member 13. The other end of the tubular sleeve 67 provides a bearing surface 69.

The bearing surfaces 63 and 69, along with the smooth internal bore of the telescoping member 13, are ground to close tolerances, and the nut 65 and attached sleeve 67 are accurately positioned within the telescoping member 13 and held at this position by a locking screw 71, all to provide a close tolerance enclosure for a large or thick walled end 73 of a rotating tubular inertia member. This inertia member also includes a thin walled tubular extension 75 formed unitarily with the thick walled portion 73. The thick walled portion 73 provides nonoverhauling threads 77 for interengagement with the nonoverhauling threads 79 of the first nonoverhauling threaded member 41. The exterior portions of the enlarged, thick walled portion 73 of the inertia member which abut the bearing surfaces 63,69, and the smooth inside diameter of the telescoping member 13 are highly polished, and sufficient clearance is provided between these bearing surfaces to permit the thick walled portion 73 to rotate about its own axis, supporting the thin walled portion 75 for rotation, within the enclosure provided by the first telescoping member 13. Excessive tolerances are avoided since, as will be understood from the description below, the thick walled portion 73 of the inertia member must contact the shoulder 63 or the bearing surface 69 without excessive end play.

It will be understood from the proceeding description that one of the primary differences between the present invention and that shown in patent application Ser. No. 695,223 is the formation of the inertia member as a thick walled portion 73 and thin walled portion 75. In accordance with the teachings of that prior application, the entire inertia member would have had a substantially uniform diameter. Since the present strut is intended to support extremely large forces, the thick walled portion 73 of the inertia member must have sufficient strength and sufficiently extensive end bearing surfaces contacting the surfaces 63 and 69 to support these large loads. These load constraints thus substantially determine a minimum wall thickness for the thick walled end 73 of the inertia member. If this thick walled portion were extended throughout the length of the inertia member, which length is determined primarily by the extent of axial movement of the overall strut 11, the inertia member of this device would have an extremely large inertia, requiring very large springs for sensing acceleration. As will be understood from the description which follows, a spring is used to rotationally accelerate the inertia member in response to axial acceleration of the telescoping members 13 and 15. To provide a response to a given linear acceleration, the spring constant and thus the size of the spring which is required, is determined by the inertia of the rotating member.

The present invention keeps this inertia at a reasonably low level while still providing a thick walled inertia member with substantial bearing forces by forming the inertia member as a thick walled portion 73 formed unitarilly with the thin walled tube 75, the thin walled tube 75 not providing a substantial portion of the inertia of the rotating element but rather providing an extension for rotationally driving the thick walled portion 73 without interfering with contact between the bearing surface 69 and the thick walled portion 73. This combination permits the use of a smaller spring for rotationally accelerating the inertia provided primarily by the thick walled portion 73.

The nonoverhauling threads 77 and 79 are of special design, as is best understood through the detailed description included in patent application Ser. No. 695,223 showing similar threads. This design permits the threads 77 to interengage the threads 79 without contacting them. As used in this disclosure, "interengaged threaded elements" means that the crests of each of the threads 77,79 are positioned between the threads of the other element 79,77, but the threads are machined with sufficient clearance so that such interengagement is possible without any thread contact. In order to maintain this clearance it is necessary that the thick walled portion 73 of the inertia member be both axially and rotationally synchronized with the first nonoverhauling threaded member 41, and it is likewise necessary that the axial alignment of these members be accurately maintained. Axial alignment, as previously described, is maintained by the sliding interngagement of the telescoping members 13 and 15. Synchronization is accomplished through the use of an overhauling threaded member 81.

This overhauling threaded member 81 is engaged with and contacts the overhauling nut 59 and is maintained in a fixed axial position relative the end cap 14 by a pair of thrust bearings 83 and 85. These thrust bearings 83,85 are positioned between a shoulder 87 formed on the nut 65 and one face of an externally threaded annular member 89, which is threaded into a counterbore 91 in one end of the nut 65. A second externally threaded annular member 93 may also be threaded into the counterbore 91 to lock the member 89 in place. The member 89 and the shoulder 87 thus provide bearing faces for the bearings 83 and 85, which in turn support an annular flange 95 extending from a threaded sleeve 97, which sleeve 97 is threaded directly onto a threaded end extension 99 of the overhauling threaded member 81. Thus the flange 95 directly supports the overhauling threaded member 81 and permits this threaded member 81 to freely rotate while fixing its axial position relative the first telescoping member 13 to which the nut 65 is threaded.

By adjusting the axial position of the threaded end 99 of the overhauling threaded member 81 within the threaded sleeve 97, the clearances of the nonoverhauling threads 77 and 79 may be adjusted and precisely set for noncontacting synchronized engagement. Once this adjustment has been made, a locking nut 101 may be threaded onto the threaded end 99 of the overhauling threaded member 81 for abutment with and locking of the sleeve 97.

The particular driving arrangement used for interconnecting the overhauling threaded member 81 and the thick walled end 73 of the inertia member, for driving this inertia member from the overhauling threaded member 81, is unique to the present application and is not shown in the prior art. Rigidly attached to the overhauling threaded member 81 by screws 103 is an annular disk or washer 105 which is in turn connected by screws 107 to a thin walled tubular member 109 coaxially surrounding the overhauling threaded member 81. The disk 105 and tube 109 may be considered to form a cup-shaped driving member rigidly mounted on the overhauling threaded member 81. As will be understood in detail below, the purpose of the tubular section 109 is to provide stops for the rotating overhauling threaded member 81 at the outward and inward limits of axial reciprocation of the telescoping members 13 and 15. The purpose of the disk 105, on the other hand, is to act as a driving member for the thick walled portion 73 of the inertia member through the thin walled portion 75 thereof to maintain the nonoverhauling threaded members 77 and 79 in synchronism below a predetermined motion threshold, as will be understood from the detailed description which follows.

A compression spring 111 is housed within a bore 113 in the end of the overhauling threaded member 81. This spring 111 is maintained at a preset precompression level by a nut 115 threaded into the end of the bore 113. A lock nut 117 maintains the nut 115 in position once it has been adjusted. The other end of the compression spring 111 bears on a sliding plug or piston member 119 positioned at the inner end of the bore 113 and drilled to carry a thrust pin 121. The thrust pin 121 extends through diametrically opposed slots 123 in the overhauling threaded member 81 so that the piston member 119 can slide axially relative the overhauling threaded member 81 but cannot rotate relative thereto. The pin 121 is seated within slots 125 in an annular thrust plate 127, the slots 125 prohibiting relative rotation between the overhauling threaded member 81 and the thrust plate 127. Compression spring 111 thus biases the thrust plate 127 toward the annular plate 105 while the slots 123 and 125 prohibit rotation of the plate 127. The plate 127 in turn biases a force transmission plate 129 toward the plate 105 through a thrust bearing 131. It will be understood that thrust bearing 131 permits free rotation of the transmission plate 129 while applying the axial bias of the compression spring 111 to this plate 129.

Three pairs of aligned conical depressions 133,135 are formed at circumferentially spaced locations in the facing surfaces of the plates 105 and 129, respectively, and hardened spherical members 137 are positioned between each such pair of recesses. The spherical members or ball bearings 137, because of the bias of the spring 111 urging the plate 129 toward the plate 105, tend to maintain a position which is centered in each of the conical recesses 133,135, thus permitting the closest spacing between the plates 105 and 129 and the greatest possible expansion of the spring 111. Thus, when the overhauling threaded member 81 is rotated, while axially supported by the bearings 83 and 85, it directly rotates the plate 105 and its conical recesses 133. These conical recesses in turn carry the ball bearing 137 and the conical recess 135 of the plate 129 in synchronism with the plate 105, so long as the force provided by the spring 111 is sufficient to maintain the ball bearing 137 centered in both of the recesses 133 and 135. Thus, rotation of the overhauling threaded member 81 in turn rotates the transmission plate 129.

The outer perimeter 137 of the transmission plate 129 is splined to a splined free end 139 of the thin walled tubular extension portion 75 of the inertia member. The transmission plate 129 is thus rotationally fixed to the inertia member but is free to move axially relative thereto.

During use of the locking strut 11 of FIGS. 1 through 6, the application of axial forces to the end caps 14 and 29 will be transmitted through the bearings 83 and 85 to the overhauling threaded member 81 and will likewise be transmitted through the nonoverhauling threaded member 41 to the overhauling threaded nut 59. These forces will cause the overhauling threaded member 81 to rotate about its own axis within the first telescoping member 13, rotating, in turn, the inertia member 73,75 through engagement of the balls 137 in the recesses 133 and 135 and, through engagement of the splined perimeter 137 of the transmission plate 129 with the portion 75 of the inertia member. So long as the axial forces are relatively low, the preload of the spring 111 will be sufficient to maintain the balls 137 centered in each of the conical recesses 133,135 so that the transmission plate 129 rotates in synchronism with the plate 105, and the inertia member 73,75 likewise rotates in synchronism with the overhauling threaded member 81. This rotation of the inertia member 73 within the enclosure formed by the first telescoping member 13 permits the nonoverhauling threads 77 thereof to thread onto the rotationally fixed nonoverhauling threads 79 of the nonoverhauling threaded member 41, these nonoverhauling threads thus remaining engaged but noncontacting, that is, in synchronism. It is, of course, necessary that the lead and direction of the overhauling threads on member 81 be identical with the lead and direction of the nonoverhauling threads 77 and 79 for this operation to occur. Thus, while the thread lead is identical, the difference in diameter between the threaded members 81 and 73 is sufficient to make one thread overhauling while the other thread is nonoverhauling. More specifically, typical thread lead angles of nonoverhauling threads on the elements 73 and 41 is less than 12° while typical thread lead angles of overhauling threads on members 81 and 59 is greater than 18°, this difference in thread lead angles being the result of identical thread lead on different diameter shafts. The threads on the members 81, 59, 73 and 41 may be multiple, as shown, if desired.

The rotation of the threads 77 by the overhauling threaded member 81 in response to axial forces on the locking strut 11 is opposed by the rotary inertia of the inertia member 73,75, substantially all of the inertia of this member being a result of the thick walled portion 73 thereof. Thus, as the overhauling threaded member 81 accelerates axially into or out of the overhauling nut 59, a corresponding rotary acceleration of the inertia member 73,75 must occur. When a high rotary acceleration is imparted to the disk 105 attached to the overhauling threaded member 81, the force required to impart this same rotary acceleration to the inertia member 73,75 through the transmission plate 129 exceeds the centering force of the ball bearing 137 within the recesses 133,135 induced by the compression spring 111. This excessive force permits relative axial movement between the plates 105 and 129 and a rolling of the balls 137 up one inclined side of each of the recesses 133,135 so that the plates 105 and 129 are no longer in rotary synchronism.

This excessive force thus permits relative rotation between the drive plate 105 and inertia member 73,75, so that the overhauling threaded member 81 can no longer maintain the synchronism between the threads 77 and 79. The threads 77 and 79 will thus engage and, since they are nonoverhauling, the friction between these threaded members will lock the strut 11 in the position it has achieved at the time of such engagement. As will be noted, the large forces which may now be applied to the locking strut 11 are transmitted directly to the end cap 14, first telescoping member 13 (on extension) or sleeve 67 (on compression), thick walled portion 73 of the inertia member, nonoverhauling threaded member 41, and end cap 29, without the interposition of roller or ball bearings which would cause stress concentrations limiting the force capability of the strut 11. In particular, the overhauling threaded member 81 is removed from the direct load bearing elements in the strut 11 as is the thin walled portion 75 of the inertia member, so that the thin walled portion 75 acts only as a synchronism driving element but not as a main load bearing portion of the inertia member 73,75. The substantial end surface areas of the thick walled portion 73 of the inertia member abutting the shoulder 55 or surface 69 permits extremely large forces to be absorbed by this strut even though the thick walled portion 73 of the inertia member, which provides substantially all of the inertia of this member 73,75, is relatively short, and thus its inertia is relatively small.

During times when the strut 11 is locked in position as just described, the spring 111 will continue to rotationally bias the transmission plate 129 toward a synchronized position so that, as soon as excessive forces are removed, the inertia member 73,75 will be rotated by the spring 111 and plate 105,129 to a synchronized position, again permitting relatively slow movement between the end caps 14 and 29. It will be appreciated that the amount of preload of the spring 111 as adjusted by the nut 115 predetermines an acceleration threshold at which the spring 111 can no longer maintain the rotary synchronism of the plates 105 and 129 and thus the rotary synchronism of the nonoverhauling threads 77,79. Free axial motion is permitted at all accelerations below this threshold level. Once the threshold level has been reached, the strut 11 will become a rigid locked strut prohibiting further motion until the forces which produced the excessive acceleration are removed. The device operates identically in both directions and will therefore lock in response to forces generating contraction or extension of the strut 11.

It is an important feature of the embodiment of FIGS. 1-6 that the plate 129 is splined and thus axially moveable relative the inertia member 73,75 so that all frictional forces in the overhauling threaded members 81 and 59 are borne by the bearings 83 and 85. Thus, since the axial forces induced by the overhauling threaded members 81,59 do not induce axial friction between the inertia member 73,75 and its surrounding bearing housing, these axial forces do not effect the precise calibration of the strut 11 in response to rotary acceleration.

From the previous description it can be seen that the spring 111 induces an axial bias within the system, and this bias, through the conical recesses 133,135 and interposed ball bearings 137, provides a rotational detent for the plates 105,129, that is, a preferred rotational orientation. This preferred orientation is overcome only when the torque, which must be transmitted between the plate 105 and the plate 129 through the balls 137 exceeds the detenting force provided by the spring 111.

Those skilled in the art will also recognize that the strut 111 of FIGS. 1-6 is purely acceleration responsive and not subject to velocity changes. Nevertheless, it will also be recognized that the device may be made velocity sensitive, for example, through the use of centrifugal brakes between the inertia member 73,75 and the first telescoping member 13, such as are shown in the embodiment of FIGS. 12 and 13 of U.S. Pat. No. 3,983,965. Thus the device operates to permit axial motion of the strut 11 below a motion threshold but to prohibit further motion if forces are applied to the end cap 14,29 which would induce motion above this predetermined threshold.

A stop member 141 is rigidly mounted on the end of the nonoverhauling threaded member 41 for engagement with stops 143 on the tubular member 109. When the strut 11 has reached its fully extended or fully compressed positions, the stop 141 will abut one of the projections 143 to prohibit further rotation of the tubular member 109 and thus to prohibit further rotation of the plate 105. This abutment thus provides a stop for linear extension and contraction of the strut 11.

It will be understood by those skilled in the art that the acceleration threshold of this device can be altered in a number of ways. The spring constant of the spring 111, or the preload induced by the nut 115, may be altered. Alternatively, the slope of the conical recesses 133,135 may be changed to vary the threshold. In addition, the rotary inertia of the thick walled portion 73 may be changed. The present invention, however, contemplates that the thick walled portion 73 of the inertia member be kept as small as possible. Ultimately, the forces which are to be supported by the strut 11 must be supported by the nonoverhauling threads 77 and sufficient threading 77 must be present to support these loads. This threading constraint thus provides a minimum linear dimension for the portion 73. In addition, the large forces must be supported by the end surfaces of the thick walled portion 73 and the required surface area provides a minimum thickness dimension. Thus, the dimensions of the thick walled portion 73 of the inertial member are predetermined to a great extent by the forces to be supported by the strut 11. If the thick portion 73 is maintained at these minimum dimensions, a minimum inertia will be provided by the thick walled portion 73 and the remainder of the inertia member is maintained as a thin walled member 75 so that the size of the spring 111, plates 105 and 129, and remaining mechanism required to rotate the inertia member 73,75 for sensing predetermined acceleration thresholds may be also maintained at a minimum. This minimizing of the size and strength of each of these components allows a reduction in cost of the strut 11, as well as a reduction in its size, while still allowing extremely large forces to be supported by the strut when the nonoverhauling threads 77,79 are engaged.

While the previous discussion has described the recesses 133 and 135 as being conical, these recesses may be of any configuration so long as the balls 137 will roll along the walls of the recesses in response to applied torque loads and, in so rolling, will separate the plates 105,129. In most instances, this will require that the radius of curvature against which the balls 137 rest be greater than the radius of curvature of the balls 137 themselves.

Figure 7:
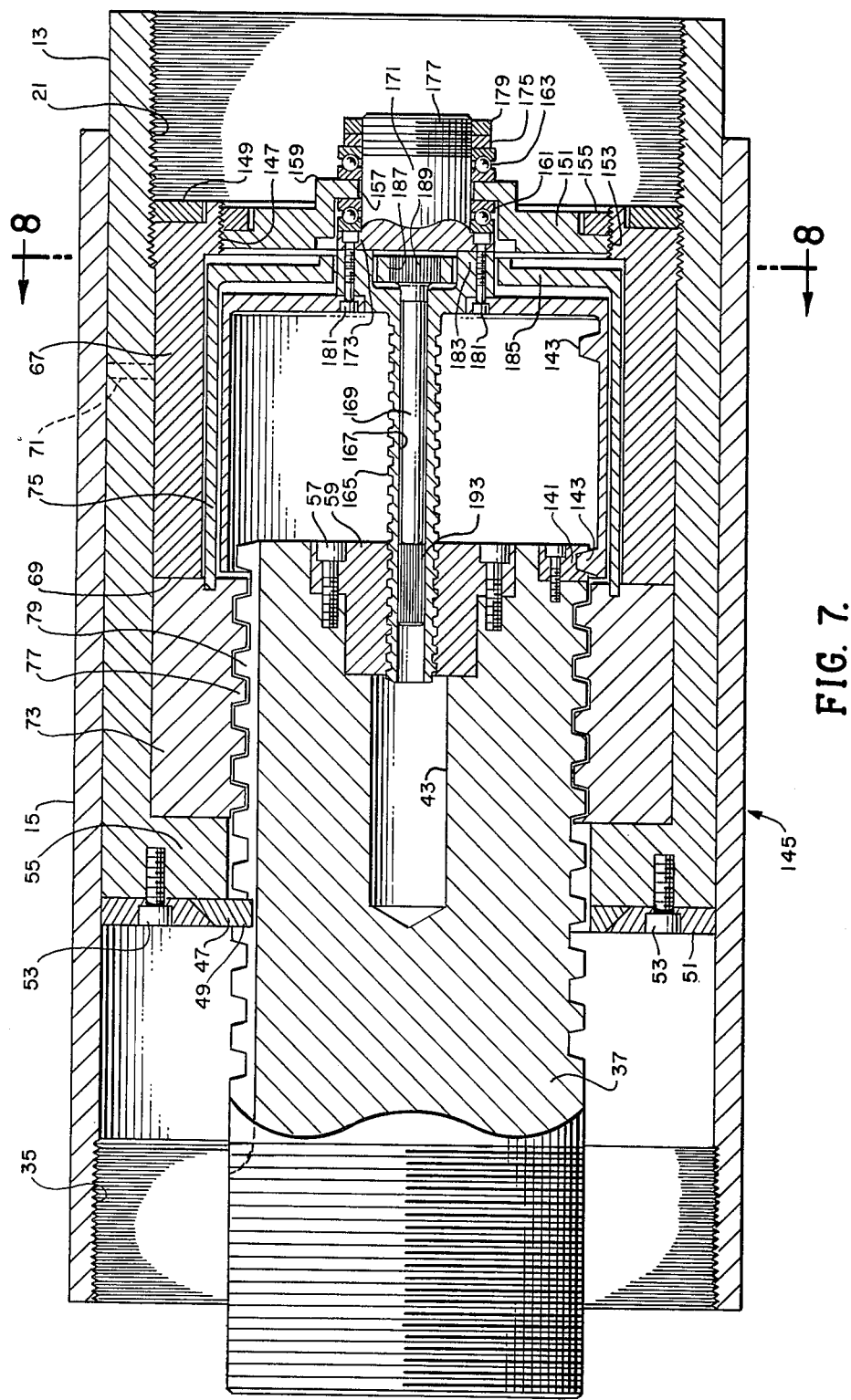
FIG. 7 is a sectional view similar to that of FIG. 1 showing an alternate embodiment of the driving spring arrangement.
Figure 8:
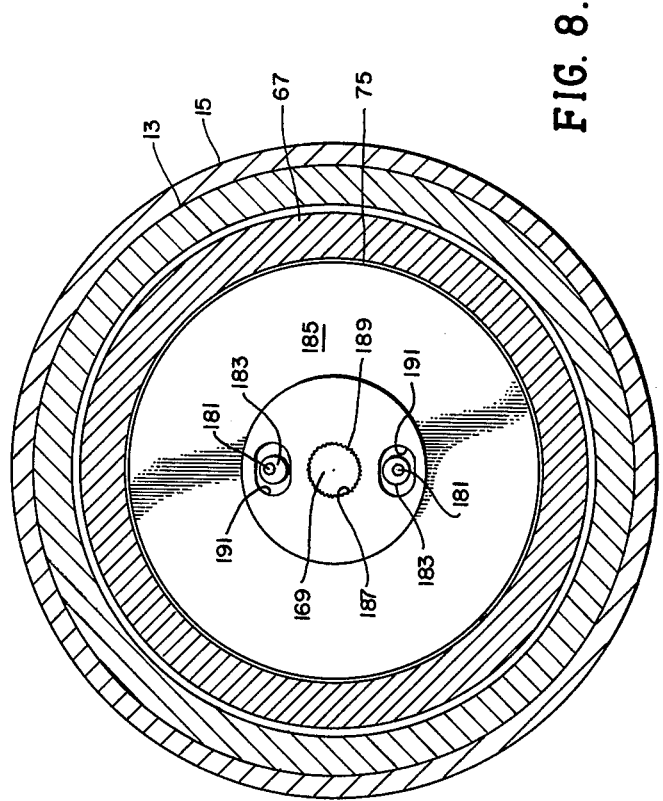
FIG. 8 is a sectional view taken along lines 8—8 of FIG. 7.

Referring now to FIGS. 7 and 8, an alternate embodiment of the strut of the present invention will be described, this alternate embodiment designed to support even larger forces than the strut of FIGS. 1-6. In particular, a strut has been designed according to the embodiment of FIGS. 7 and 8 which, in the locked configuration, will support two million pounds of axial load.

Since many of the elements of the strut of FIGS. 7 and 8 are identical with elements of the strut of FIGS. 1-6 (although in most instances larger in size to support larger forces), only the central portion of the strut has been shown, the end caps 14 and 29 having been removed to simplify the drawing of FIG. 7. Similar parts will be similarly labeled and, although the first nonoverhauling threaded member is numbered 37 in accordance with the similar element of FIGS. 1-6, it will be noted that the element in FIG. 7 is threaded at its support end for direct attachment to an end cap bored and threaded to receive this member. This does not, however, change the fundamental properties or function of the first nonoverhauling threaded member 37.

Elements numbered identically are similar or identical in their construction to those described in reference to FIGS. 1 through 6 and these elements will not again be described.

The locking strut 145 as shown in FIG. 7 differs from that of FIGS. 1–6 primarily in the mechanism used for desynchronizing the threads 77 and 79 when an acceleration threshold is reached. In this instance, the tubular spacer 67 is internally threaded at 147 and locked in place with a lock nut 149. It will be appreciated, of course, that the end cap 14 will be threaded against the remaining face of the lock nut 149 to support compression loads in the strut. A bearing flange 151, which is externally threaded at 153, is mounted on the spacer 67 and locked in place by a lock nut 155. This mounting flange 151 includes a central bore 157 and an annular portion 159 surrounding the bore 157 which provides a mounting location for a pair of thrust bearings 161 and 163. The overhauling threaded member 165 in this embodiment is hollow and includes an internal cylindrical bore 167 for housing a torsion bar 169. The overhauling threaded member 165 is bolted onto and supported by a mounting spindle 171.

The mounting spindle 171 includes an increased diameter shoulder 173 which, together with an adjustment nut 175 which threads onto a threaded end 177 of the spindle 171, provides clamping surfaces for supporting the spindle 171 on the thrust bearings 161 and 163. A lock nut 179 maintains the position of the nut 175 so that the spindle 171, through the thrust bearings 161 and 163, is mounted in an axially fixed location on the flange 151 but is free to rotate.

Spindle 171 is held onto the overhauling threaded member 165 by plural bolts 181, each of which passes through the center of a leg 183 formed unitarilly with the overhauling threaded member 165. These legs 183 provide clearance for independent rotation, when torque is applied, of the thin walled portion 75 of the inertia member. In this case the thin walled portion 75 is formed unitarilly with a flat circular portion 185 of the inertia member, which flat portion 185 extends to provide a central bore 187 which is splined to receive a splined end 189 of the torsion rod 169. As best shown in FIG. 8, the legs 183 surrounding the screws 181 are fitted within elongate openings or slots 191 to permit a limited degree of relative rotation between the flat plate 185 and spindle 171.

The overhauling threaded member 165 and torsion rod 169 are splined together at the unsupported end of the overhauling threaded member 165, as shown at 193. When rotation is induced in the overhauling threaded member through its axial movement relative the overhauling nut 59, it rotates the splined end of the torsion rod 169. This, in turn, rotates the other end 189 of the torsion rod 169 which is directly splined to the inertia member 73,75. So long as substantial twisting of the torsion rod 169 does not occur, rotation of the overhauling threaded member 165 directly rotates the inertia member 73,75 to maintain the threads 77,79 in synchronism. However, when excessive linear force is applied to the strut 145, substantial torque will be applied to the torsion bar 169, the overhauling threaded members 165 and 59 attempting to induce accelerated rotation in one end of the torsion bar 169 and the inertia of the inertia member 73,75 resisting this acceleration. Faced with the torque required to induce the required acceleration in the inertia member 73,75, the torsion rod 169 will twist so that the end 189 lags the splined end 193. This lagging, when it becomes large, will desynchronize the threads 77,79 so that the strut 145 will lock. Thus, without any relatively moving parts, the torsion bar 169 acts as an acceleration sensor and desynchronizes the nonoverhauling threads 77,79. It will be understood that the torsion rod 169 is relatively stiff in comparison with other spring members and can thus be used to drive relatively massive inertia members 73,75 without requiring much space in the strut 145, since it is housed substantially within the overhauling threaded member 165. In this embodiment none of the elements are free to move axially relative the member on which they are mounted. Rather, all of the relative movement utilized for sensing acceleration levels is rotary and is provided by the torsion bar 169. The torsion bar may be manufactured in a size, and of a material, which permits the sensed acceleration threshold or lockup to be predetermined.

Figure 9:
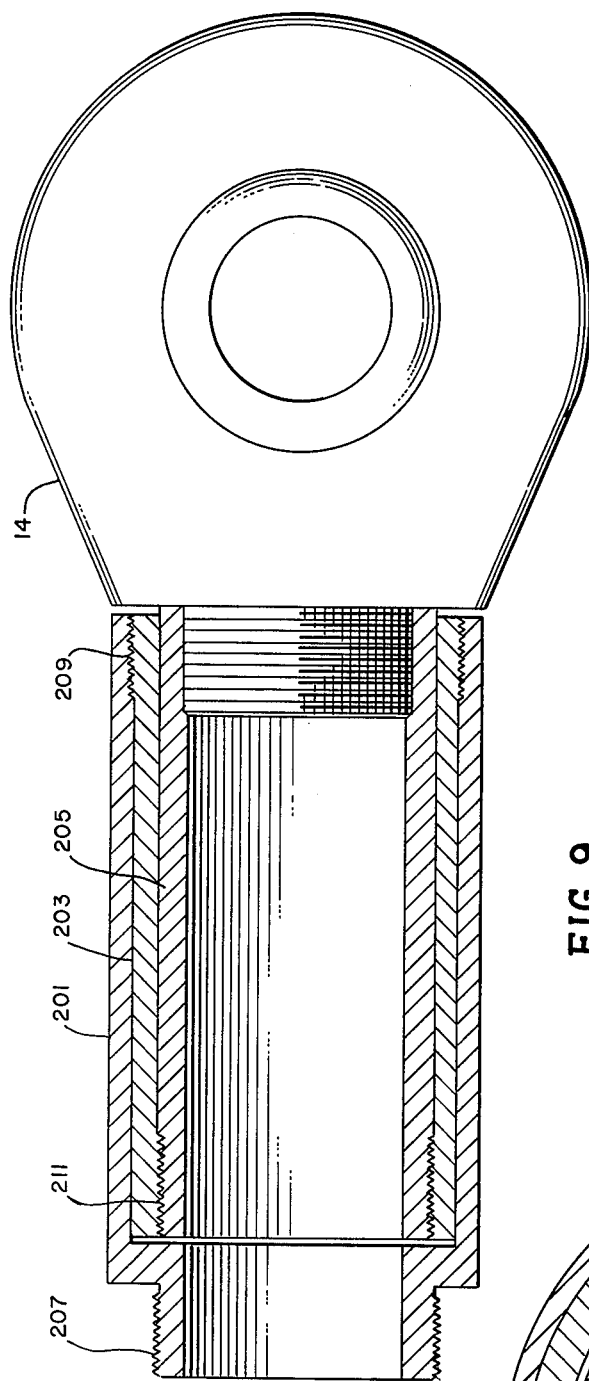
FIG. 9 is a sectional view of a spring constant adjustment member which may optionally be connected in series with the strut of FIG. 1 or FIG. 7.

Referring now to FIG. 9, an adapter coupling which may be used with either of the embodiments of FIGS. 1 through 6 or 7 and 8 is shown. This coupling permits an alteration in the spring constant of the strut 11,145 after the strut has locked. It has been found that in some systems where very large forces are to be absorbed by a strut 11,145 (as during an earthquake), the systems require a particular spring constant to be designed into the strut when locked. If the spring constant is to be reduced so that the locked strut, in effect, has more given, the apparatus of FIG. 9 will permit such reduction without adding excessively to the length of the strut or introducing members subject to failure in response to the extreme loads borne by these struts.

The apparatus of FIG. 9 is designed to fit between one end of the struts 11,145 and the end cap 14 and thus results in a moderate extension in the length of the overall strut. The device comprises three coaxial tubular elements 201, 203, and 205, each of which is attached at its opposite ends to different supporting elements. Thus, the member 201 is attached at a first threaded end 207 to the strut 11,145, and at its second end by the threads 209 to telescoping member 203. The member 203, is, in turn, connected at its opposite end by threads 211 to one end of the member 205. The remaining end of the member 205 is, in turn, connected to the end cap 14. Each of the tubular elements, except where threaded, is closely fitted with the remaining tubular elements but is free to slide or telescope with regard to those elements. Thus, the effective length in regard to the spring constant is approximately three times the length of any one of the tubular members 201,203,205. In other words, the tubular members 201–205 are serially connected so that the resulting spring constant of the device shown in FIG. 9 is that of a relatively long tube (approximately three times the length of the member 201) since the members can slide relative one another. It will be recognized that, with this arrangement, with any given applied force, alternate tubular members 201,203,205 will be in compression while the remaining tubular members 201,203,205 are in tension.

By thus telescoping multiple tubes, a wide variety of spring constants can be achieved while still providing substantial, thick walled, tubular lengths for supporting the very large forces which must be supported by the strut of this invention.

I claim:

1. A mechanism for arresting motion between first and second relatively moveable objects, comprising:

a first member axially and rotationally fixed on said first object;

a second member axially and rotationally fixed on said second object;

a rotating member interposed between said first and second members, said member including a thick walled portion for engaging said first and second members when motion between said first and second members is to be arrested, said thick walled portion having sufficient clearance from each of said first and second members to allow rotation thereof when said motion is not arrested, said rotating member including a thin walled portion connected for rotationally driving said thick walled portion, the rotational inertia of said thin walled portion being small in comparison with that of the thick walled portion; and means connected to said thin walled portion for rotating said thick walled portion in response to relative movement between said first object and first member and said second object and second member, said means maintaining said clearance when said relative movement is below a predetermined motion threshold and being incapable of maintaining said clearance when said motion is above said predetermined motion threshold.

2. A mechanism for arresting motion as defined in claim 1 wherein said thick walled portion and one of said first and second members are threaded onto one another.

3. A mechanism for arresting motion as defined in claim 2 wherein the threads of said thick walled portion and said one of said first and second members ae nonoverhauling.

4. A mechanism for arresting motion as defined in claim 2 wherein the threads of said thick walled portion and said one of said first and second members engage one another without contact to provide said clearance when said relative movement is below said predetermined portion threshold.

5. A mechanism for arresting motion as defined in claim 4 wherein said means for rotating maintains the threads of said thick walled portion and said one of said first and second members synchronized during rotation in order to maintain said clearance.

6. A mechanism for arresting motion as defined in claim 1 wherein said means for rotating comprises an overhauling lead screw connected to a torsional spring, said overhauling leading screw rotating a first end of said torsional spring, the other end of said torsional spring being connected to said thin walled portion for rotating said thick walled portion.

7. A mechanism for arresting motion as defined in claim 6 wherein said torsional spring is coaxial with and housed within said overhauling lead screw.

8. A mechanism for arresting motion as defined in claim 1 wherein said thick walled portion comprises an inertia member for sensing the relative acceleration between said first and second members, and wherein said means for rotating comprises a resilient element for rotationally driving said rotating inertia member, said resilient element comprising:

a pair of rotating members, one of which is connected to said thin walled portion and the other of which is rotationally driven in accordance with relative movement between said relatively moveable objects; and detent means for providing the preferred relative rotational position of said pair of rotating members.

9. A mechanism for arresting motion as defined in claim 8 wherein said detent means comprises a ball positioned between facing recesses in said pair of rotating members and means urging one of said facing recesses toward the other.

10. A mechanism for arresting motion as defined in claim 1 wherein said mechanism has a spring constant when arresting said motion additionally comprising:

means connected between said first relatively moveable object and said first member axially and rotationally fixed on said first object for altering said spring constant of said motion arresting mechanism when said motion is above said predetermined motion threshold.

11. A mechanism for arresting motion as defined in claim 10 wherein said spring constant changing means comprises plural concentric tubular elements connected between said first relatively moveable object and said first member, said plural tubular elements alternating in compression and tension when said motion is above said predetermined motion threshold.

12. A mechanism for arresting motion as defined in claim 10 wherein said spring constant changing means comprises plural concentric tubes, each telescoping relative an adjacent tube at one end of the respective tubes but fixed relative said adjacent tube at the other end of said tubes, said plural tubes interconnected between said first relatively moveable object and said first member.

13. A mechanism for arresting linear motion between first and second relatively moveable objects, comprising:

a pair of telescoping members attached, respectively, to said first and second objects; and means sensing the motion of said objects for limiting the telescoping of said pair of members when said motion reaches a predetermined threshold, said means comprising:

an overhauling lead screw for producing rotary motion proportional to said linear motion;

a thin walled tube driven rotationally by said overhauling lead screw; and a thick walled tube driven rotationally by said thin walled tube, said thick walled tube directly interposed between said pair of telescoping members but engaging one of said pair of telescoping members only when said motion exceeds said predetermined threshold.

14. A mechanism for arresting linear motion as defined in claim 13 wherein said means sensing the motion of said objects additionally comprises a torsion spring interconnected between said overhauling lead screw and said thin walled tube.

15. A mechanism for arresting linear motion as defined in claim 14 wherein said torsion spring comprises a torsion rod concentric with and inside of said overhauling lead screw.

16. A mechanism for arresting linear motion as defined in claim 13 wherein said means sensing the motion of said objects additionally comprises a detent mechanism for providing a preferred relative rotational position between said overhauling lead screw and thin walled tube.

17. A mechanism for arresting linear motion as defined in claim 16 wherein said detent mechanism comprises:

a first flange mounted on said overhauling lead screw;
a second flange mounted on said thin walled tube;
means biasing said first and second flanges toward one another; and
a ball located between said flanges and positioned within a depression in the face of each of said flanges, said ball, under the bias of said biasing means, maintaining a preferred position in said depressions and thus maintaining a preferred rotational position between said first and second flanges.

18. A mechanism for arresting linear motion as defined in claim 13 wherein the end of said thick walled tube abuts the other of said pair of telescoping members when said motion exceeds said predetermined threshold.

19. A mechanism for arresting linear motion as defined in claim 13 wherein the diameter and length of said thick walled tube are just sufficient to bear the load on said mechanism when said motion exceeds said predetermined threshold, said thin walled tube having a length which is selected to make the overall length of said thick and thin walled tubes constant regardless of the load for which said strut is designed.

20. A mechanism for arresting linear motion as defined in claim 13 wherein said thick walled portion is rotationally supported on one of said pair of telescoping members and wherein said thin walled portion is rotationally supported by said thick walled portion.

21. A mechanism for arresting linear motion between a pair of mechanical elements above a predetermined motion threshold comprising:
inertia responsive motion sensing means for sensing a predetermined linear motion threshold of said pair of mechanical elements, said sensing means comprising:
means for producing rotary motion proportional to said linear motion; and
an internally threaded inertia member mounted for free rotation on one of said pair of mechanical elements; a thin walled portion of said inertia member rotated by said rotary motion producing means, a thick walled tubular portion of said inertia member providing substantially all of the inertia of said inertia responsive motion sensing means;
an externally threaded member mounted on the other of said pair of mechanical elements and sized to fit within said thick walled tubular portion of said inertia member, said externally threaded member having threads which, when synchronized and engaged with the threads of said inertia member, do not contact the threads of said inertia member; and
means for rotating said inertia member and maintaining the threads of said externally threaded member in synchronism with the threads of said inertia member only when said motion between said pair of mechanical elements is below said motion threshold.

22. A shock mounting strut for controlling motion between a pair of relatively moveable mechanical elements comprising:
a first nonoverhauling threaded member mounted in an axially fixed, rotatable position on one of said mechanical elements;
a second nonoverhauling threaded member mounted in a fixed axial and rotational position on the other of said mechanical elements, the threads of said first and second members being engaged; and
means for rotating said first member during relative movement of said elements below a predetermined motion threshold, said means being inoperable above said motion threshold, said means comprising:
means producing rotary motion in response to relative axial motion between said pair of relatively moveable mechanical elements; and
a detent mechanism connected between said means for producing rotational motion and said first nonoverhauling threaded member for rotating said first nonoverhauling threaded member.

23. A shock mounting strut as defined in claim 22 wherein said detent mechanism comprises:
a pair of relatively moveable flanges, one of said flanges attached to said means for producing rotary motion and the other of said flanges attached to said first nonoverhauling threaded member, each of said flanges having a depression;
a ball bearing mounted between said flanges and seated in each of said depressions; and
means resiliently biasing said flanges toward one another to center said ball bearing in said depression.

24. A shock mounting strut for controlling motion between a pair of relatively moveable elements comprising:
a first nonoverhauling threaded member mounted in an axially fixed rotatable position on one of said mechanical elements;
a second nonoverhauling threaded member mounted in a fixed axial and rotational position on the other of said mechanical elements, the threads of said first and second members being engaged; and
means for rotating said first member during relative movement of said elements below a predetermined motion threshold, said means being inoperable above said motion threshold, said rotating means comprising:
an overhauling lead screw for producing rotary motion in response to relative axial motion of said pair of relatively moving mechanical elements; and
a torsion rod mounted coaxially within said overhauling lead screw and attached to rotate said first nonoverhauling threaded member.

25. A shock mounting strut for controlling motion between a pair of relatively moveable mechanical elements comprising:
a pair of telescoping members, one of which is connected to each of said relatively moveable mechanical elements;
means for controlling the motion of said telescoping members, said means permitting relative linear motion between said telescoping members below a predetermined motion threshold but prohibiting motion between said telescoping members above said predetermined threshold; and
means interconnecting said telescoping members with one of said pair of relatively moving elements, said means comprising a spring for adjusting the spring constant of said shock mounting strut when motion between said telescoping members is prohibited.

26. A shock mounting strut as defined in claim 25 wherein said spring comprises three concentric tubular members, two of which are mounted concentrically within the third, said third tubular member attached at one end to one of said pair of mechanical elements and attached at its other end to a second one of said tubular members, said second of said tubular members connected at its other end to the first of said tubular members, the other end of said first of said tubular members connected to said shock mounting strut, said first and third tubular members being in compression when said second tubular member is in tension, said tubular members changing the spring constant of said strut without adding excessive length to said strut.

* * * * *